(12) United States Patent
Kasuya et al.

(10) Patent No.: US 8,959,914 B2
(45) Date of Patent: Feb. 24, 2015

(54) WASTE HEAT UTILIZATION DEVICE FOR INTERNAL COMBUSTION ENGINE

(75) Inventors: Junichiro Kasuya, Isesaki (JP); Yasuaki Kanou, Maebashi (JP)

(73) Assignee: Sanden Corporation, Gunma (JP)

( * ) Notice: Subject to any disclaimer, the term of this patent is extended or adjusted under 35 U.S.C. 154(b) by 1351 days.

(21) Appl. No.: 12/738,275

(22) PCT Filed: Oct. 15, 2008

(86) PCT No.: PCT/JP2008/068669
§ 371 (c)(1),
(2), (4) Date: Apr. 15, 2010

(87) PCT Pub. No.: WO2009/051139
PCT Pub. Date: Apr. 23, 2009

(65) Prior Publication Data
US 2010/0205959 A1 Aug. 19, 2010

(30) Foreign Application Priority Data
Oct. 17, 2007 (JP) ................................ 2007-270128

(51) Int. Cl.
| | |
|---|---|
| *F01K 23/10* | (2006.01) |
| *F02G 5/04* | (2006.01) |
| *F01K 23/06* | (2006.01) |
| *F01K 25/10* | (2006.01) |
| *F01P 3/22* | (2006.01) |

(52) U.S. Cl.
CPC ............... *F02G 5/04* (2013.01); *F01K 23/065* (2013.01); *F01K 23/101* (2013.01); *F01K 25/10* (2013.01); *F01P 3/2285* (2013.01); *F02G 2260/00* (2013.01); *Y02T 10/166* (2013.01)
USPC .................... 60/618; 60/616; 60/671

(58) Field of Classification Search
CPC ..... F01K 23/065; F01K 23/101; F01K 25/10; F02G 5/04; F01P 3/2285
USPC .......... 60/614–618, 320, 620, 641.1–641.15, 60/643–681; 290/1 A; 123/2
See application file for complete search history.

(56) References Cited

U.S. PATENT DOCUMENTS

| | | | |
|---|---|---|---|
| 5,904,044 A * | 5/1999 | White .............................. | 60/443 |
| 2006/0174623 A1* | 8/2006 | Sato et al. ..................... | 60/641.8 |
| 2006/0254276 A1 | 11/2006 | Sato et al. | |
| 2009/0211253 A1* | 8/2009 | Radcliff et al. ................. | 60/670 |

FOREIGN PATENT DOCUMENTS

| | | | |
|---|---|---|---|
| EP | 1443183 | * | 4/2004 |
| EP | 1 443 183 | | 8/2004 |

(Continued)

OTHER PUBLICATIONS

T. Yanagisawa et al., "Study on Fundamental Performance of Scroll Expander", Partial Transactions of Japan Society of Mechanical Engineers, Series B, vol. 54, No. 506, pp. 2798-2803, Oct. 1988.

*Primary Examiner* — Thomas Denion
*Assistant Examiner* — Kelsey Stanek
(74) *Attorney, Agent, or Firm* — Cozen O'Connor (57) ABSTRACT

A waste heat utilization device (2) for an internal combustion engine has a Rankine cycle (8) that recovers waste heat from an internal combustion engine (4), a generator (30) that is rotationally driven by an expander (14) and converts a rotational drive force into electric power, a converter (32) that controls the rotational speed of the expander (14) through the generator (30), refrigerant-condition detecting means (22, 24, 26, 28) that detects the pressure and temperature of a refrigerant passing through the expander (14), and a controller (34) that calculates pressure ratio Rp of the refrigerant in the immediate upstream and downstream of the expander (14) and specific heat ratio K of the refrigerant passing through the expander (14) on the basis of the pressure and temperature of the refrigerant, which have been detected by the refrigerant-condition detecting means (22, 24, 26, 28), calculates a preset pressure ratio Rps of the pressure ratio Rp by multiplying predetermined volume ratio Rv of the expander (14) by the specific heat ratio K, and specifies rotational speed N of the expander (14) to the converter (32) on the basis of the pressure ratio Rp and the preset pressure ratio Rps.

8 Claims, 5 Drawing Sheets

(56) References Cited

FOREIGN PATENT DOCUMENTS

| EP | 1443183 | A1 | * | 8/2004 |
| --- | --- | --- | --- | --- |
| JP | 61-150014 | | | 7/1986 |
| JP | 2007-255327 | | | 10/2007 |
| JP | 2008-169777 | | | 7/2008 |
| WO | WO 03/031775 | | | 4/2003 |

* cited by examiner

WASTE HEAT UTILIZATION DEVICE FOR INTERNAL COMBUSTION ENGINE

RELATED APPLICATIONS

This is a U.S. National Phase Application under 35 USC §371 of International Application PCT/JP2008/068669 filed on Oct. 15, 2008.

This application claims the priority of Japanese Patent Application No. 2007-270128 filed Oct. 17, 2007, the entire content of which is hereby incorporated by reference.

TECHNICAL FIELD

The present invention relates to a waste heat utilization device for an internal combustion engine, and more specifically, to a waste heat utilization device for an internal combustion engine, which is suitable for a vehicle.

BACKGROUND ART

This type of a waste heat utilization device for an internal combustion engine has a Rankine cycle provided in its refrigerant channel with an evaporator that heats a refrigerant by using waste heat recovered, for example, from a coolant after cooling a vehicle engine, an expander that expands the refrigerant that has passed through the evaporator and thus produces a rotational drive force, a condenser that condenses the refrigerant that has passed through the expander, and a pump that pumps the refrigerant that has passed through the condenser into the evaporator, in the order named, and a generator that is rotationally driven by the expander and converts the rotational drive force into electric power.

There is a well-known technology that adjusts the amount of the refrigerant circulating through the Rankine circuit by controlling the rotational speed of the expander, and thus improves the recovered power of the expander without reducing the pressure of a high-pressure refrigerant existing on the inlet side of the expander (see, for example, Unexamined Japanese Patent Publication No. 61-150014).

It is known that the expander is driven with maximum efficiency when a pressure ratio of suction pressure Ps of the refrigerant sucked into the expander to discharge pressure Pe of the refrigerant discharged from the expander (Ps/Pe) (so-called expansion ratio), a volume ratio of refrigerant discharge volume Ve to refrigerant suction volume Vs (Ve/Vs), and a specific heat ratio K of the refrigerant passing through the expander are calculated, and the pressure ratio (Ps/Pe) is equal to a value obtained by multiplying the volume ratio (Ve/Vs) by the specific heat ratio K (hereinafter, referred to as a preset pressure ratio), that is, when a relation, the pressure ratio (Ps/Pe)=the preset pressure ratio (Ve/Vs)$^K$, is true (see, for example, Transactions of the Japan Society of Mechanical Engineers. B 54 (506) "Study on Fundamental Performance of Scroll Expander").

It can be easily analogized from the above-mentioned prior art that the maximum efficiency in the waste heat recovery of the waste heat utilization device is obtained by controlling the rotational speed of the expander so that the relation, the pressure ratio (Ps/Pe)=the preset pressure ratio (Ve/Vs)$^K$, is true, and then adjusting the amount of the refrigerant circulating through the Rankine cycle.

The prior art, however, has never defined specific structure and control for controlling the rotational speed of the expander. Moreover, the maximum efficiency is no more than theoretical efficiency, and the expansion of the refrigerant in the expander is actually a polytropic expansion. The maximum efficiency therefore cannot be obtained even if the foregoing relation is true.

DISCLOSURE OF THE INVENTION

The invention has been made in light of the above-described issues. It is an object of the invention to provide a waste heat utilization device for an internal combustion engine, which is capable of easily and reliably enhancing efficiency in waste heat recovery.

In order to achieve the above object, the waste heat utilization device for an internal combustion engine according to the invention has a Rankine cycle provided in a refrigerant channel with an evaporator that heats a refrigerant by using waste heat recovered from an internal combustion engine and thus secures predetermined heat absorption amount from the internal combustion engine, an expander that expands the refrigerant that has passed through the evaporator at a predetermined volume ratio and thus produces a rotational drive force, a condenser that condenses the refrigerant that has passed through the expander, and a pump that pumps the refrigerant that has passed through the condenser into the evaporator, in the order named; a generator that is rotationally driven by the expander and converts the rotational drive force into electric power; a converter that controls the rotational speed of the expander through the generator; refrigerant-condition detecting means that detects pressure and temperature of the refrigerant passing through the expander; and a controller that calculates a ratio between refrigerant pressures in the immediate upstream and downstream of the expander, and, a specific heat ratio of the refrigerant passing through the expander on the basis of the pressure and temperature of the refrigerant, which have been detected by the refrigerant-condition detecting means, calculates a preset pressure ratio of the pressure ratio by multiplying a predetermined volume ratio by the specific heat ratio, and specifies the rotational speed of the expander to the converter on the basis of the pressure ratio and the preset pressure ratio.

According to the waste heat utilization device for an internal combustion engine, even if the expander rotational speed is drastically changed by heat load of the Rankine cycle, the ratio between pressures in the immediate upstream and downstream of the expander, or expansion ratio, can be approximated to the preset pressure ratio and maintained virtually constant. It is then possible to enhance efficiency in waste heat recovery of the waste heat utilization device and power generation efficiency, as compared to a case in which the expander rotational speed is controlled only on the basis of the pressure of a high-pressure refrigerant on an inlet side of the expander.

According to a preferred aspect, in the waste heat utilization device for an internal combustion engine, the controller decreases the expander rotational speed when the pressure ratio is lower than the preset pressure ratio, and increases the expander rotational speed when the pressure ratio is higher than the preset pressure ratio.

The foregoing constitution reliably enhances the efficiency in waste heat recovery of the waste heat utilization device and the power generation efficiency.

According to a preferred aspect, in the waste heat utilization device for an internal combustion engine, the controller includes database in which the specific heat ratio is referred on the basis of the refrigerant pressure and temperature detected by the refrigerant-condition detecting means.

The foregoing constitution enables an easy calculation of the specific heat ratio of the refrigerant passing through the expander, and easily and reliably enhances the efficiency in waste heat recovery and the power generation efficiency.

According to a preferred aspect, in the waste heat utilization device for an internal combustion engine, the controller sets the expander rotational speed back to the rotational speed before being changed if the pressure ratio does not change by the increase or decrease of the expander rotational speed.

The foregoing constitution eliminates a needless process of changing the expander rotational speed when there is no change in pressure ratio. The constitution accordingly promotes the stability and efficiency of the Rankine cycle, and thus promotes the stability of actuation of the waste heat utilization device and the control on the expander rotational speed as well. Consequently, the efficiency in waste heat recovery of the waste heat utilization device and the power generation efficiency are further enhanced.

According to a preferred aspect, in the waste heat utilization device for an internal combustion engine, the controller increases or decreases the expander rotational speed within a range from minimum rotational speed that makes the efficiency of the expander equal to or higher than a predetermined value to maximum rotational speed based upon a safety coefficient relative to the rotation of the expander.

With the foregoing constitution, the Rankine cycle can be properly actuated by carrying out a proper rotary drive of the expander. The constitution thus promotes the stability and efficiency of the Rankine cycle, and thus promotes the stability of actuation of the waste heat utilization device and thus the efficiency of control on the expander rotational speed as well. Consequently, the efficiency in waste heat recovery of the waste heat utilization device and the power generation efficiency are further enhanced.

According to a preferred aspect, in the waste heat utilization device for an internal combustion engine, the controller sets the expander rotational speed to secure predetermined heat absorption amount.

With the foregoing constitution, even if the expander rotational speed is drastically changed by heat load of the Rankine cycle, a ratio between the pressures in the immediate upstream and downstream of the expander, or expansion ratio, can be approximated to the preset pressure ratio and maintained virtually constant, and the heat absorption amount in the evaporator and that in the Rankine cycle can be secured. It is then possible to further enhance efficiency in waste heat recovery of the waste heat utilization device and the power generation efficiency.

According to a preferred aspect, in the waste heat utilization device for an internal combustion engine, the controller calculates a ratio of the pressure ratio to the preset pressure ratio, and previously sets the preset pressure ratio so that the ratio falls in a predetermined range.

With the foregoing constitution, refrigerant expansion in the expander is actually a polytropic expansion because of heat entry and exit resulted from a slight leakage of refrigerant or the like. The preset pressure ratio is previously determined so that the above-mentioned ratio falls in the predetermined range in consideration of so-called leakage performance of the expander. By so doing, the maximum efficiency in waste heat recovery of the waste heat utilization device and the maximum power generation efficiency are achieved.

According to a preferred aspect, in the waste heat utilization device for an internal combustion engine, the controller previously sets the preset pressure ratio so that the ratio falls in a range from 1.0 to 1.25.

With the foregoing constitution, if the refrigerant leakage performance in the expander is considered, the maximum power generation efficiency of the generator can be achieved by regulating the ratio within the range. Control on the expander rotational speed according to the ratio therefore surely achieves the maximum efficiency in waste heat recovery of the waste heat utilization device and the maximum power generation efficiency.

According to a preferred aspect, in the waste heat utilization device for an internal combustion engine, the controller previously estimates a preset ratio of the ratio at which the power generation efficiency of the generator becomes the highest, and previously sets the preset pressure ratio so that the ratio falls in a range of 0.05 either side of the preset ratio.

With the foregoing constitution, even if the refrigerant leakage performance is improved as a result of improvement in performance of the expander, it is possible to previously estimate the preset ratio at which the power generation efficiency of the generator becomes the highest and to control the expander rotational speed on the basis of the preset ratio. Consequently, the maximum efficiency in waste heat recovery of the waste heat utilization device and maximum power generation efficiency can be further reliably achieved.

BEST MODE FOR CARRYING OUT THE INVENTION

One embodiment of the invention will be described below with reference to the attached drawings.

Figure 1:
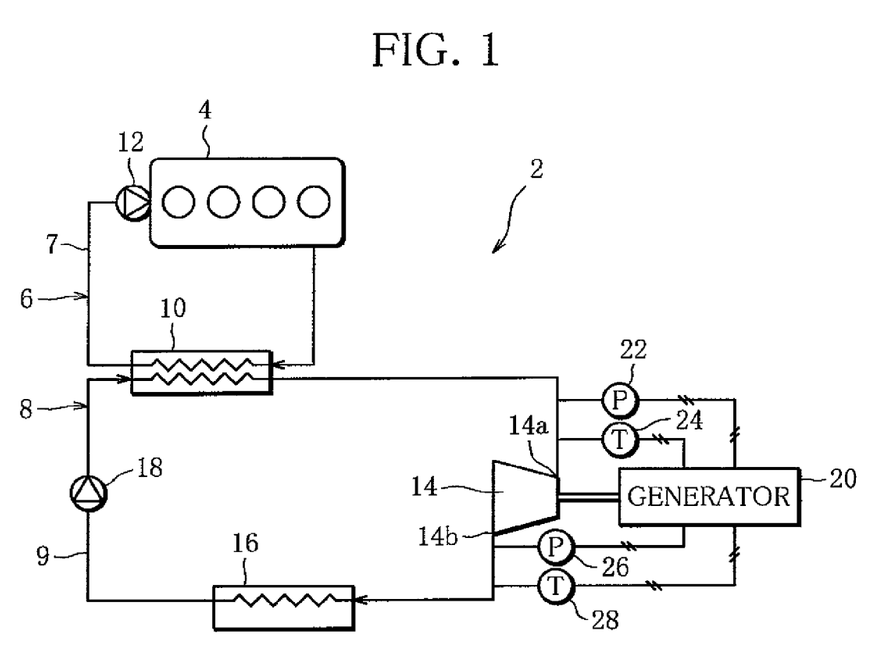
FIG. 1 is a diagram showing a waste heat utilization device for an internal combustion engine according to one embodiment of the invention.

FIG. 1 is a diagram schematically showing a configuration of a waste heat utilization device 2 of the present embodiment. The waste heat utilization device 2 includes, for example, a coolant circuit 6 that refrigerates a vehicle engine (internal combustion engine) 4 and a Rankine cycle circuit (Rankine cycle) 8 (hereinafter, referred to as RC circuit) that recovers the waste heat of the engine 4.

The coolant circuit 6 is provided, in a coolant channel 7 extending from the engine 4, with an evaporator 10 and a water pump 12 in the order from the upstream side of a coolant flow. The coolant circuit 6 thus forms a closed circuit.

The evaporator 10 is a heat exchanger that exchanges heat between a coolant of the coolant circuit 6 and a refrigerant of the RC circuit 8. The coolant heated in the engine 4, or hot water, is used as a heat medium to absorb the waste heat of the engine 4 into the RC circuit 8 and recover the waste heat. The coolant, which is reduced in temperature by the heat absorption of the refrigerant after passing through the evaporator 10, refrigerates the engine 4 by passing through the engine 4, and again turns into hot water.

The water pump 12 is driven according to the revolution speed of the engine 4, and makes the coolant properly circulate through the coolant circuit 6.

Interposed in a refrigerant channel 9 of the RC circuit 8 are the evaporator 10, an expander 14, a condenser 16, and a refrigerant pump (pump) 18 in the order from the upstream side of a refrigerant flow. The RC circuit 8 thus forms a closed circuit.

The expander 14 is a positive-displacement fluid machine that expands the refrigerant that has been heated by the evaporator 10 into overheated steam, and generates a rotational drive force. A power generating system 20 is mechanically connected to the expander 14. The power generating system 20 converts the rotational drive force of the expander 14 into electric power and generates AC power.

The condenser 16 is an air-cooled heat exchanger that exchanges heat between the refrigerant discharged from the expander 14 and outside air and turns the refrigerant into condensate. The liquid refrigerant that has been condensed by the condenser 16 is pumped into the evaporator 10 by a refrigerant pump 18.

The refrigerant pump 18 is an electric pump that is driven according to a signal inputted to an actuator thereof, and makes the refrigerant properly circulate through the RC circuit 8.

In the channel 9, there are interposed a pressure sensor (refrigerant-condition detecting means) 22 that detects a suction pressure Ps of the refrigerant sucked into the expander 14 and a temperature sensor (refrigerant-condition detecting means) 24 that detects suction temperature Ts in the order from the evaporator 10 side, to be located near an inlet 14a of the expander 14.

Likewise, in the vicinity of an outlet 14b of the expander 14, there are disposed a pressure sensor (refrigerant-condition detecting means) 26 that detects a discharge pressure Pe of the refrigerant discharged from the expander 14 and a temperature sensor (refrigerant-condition detecting means) 28 that detects discharge temperature Te in the order from the expander 14 side. The sensors 22, 24, 26 and 28 are electrically connected to the power generating system 20.

Figure 2:
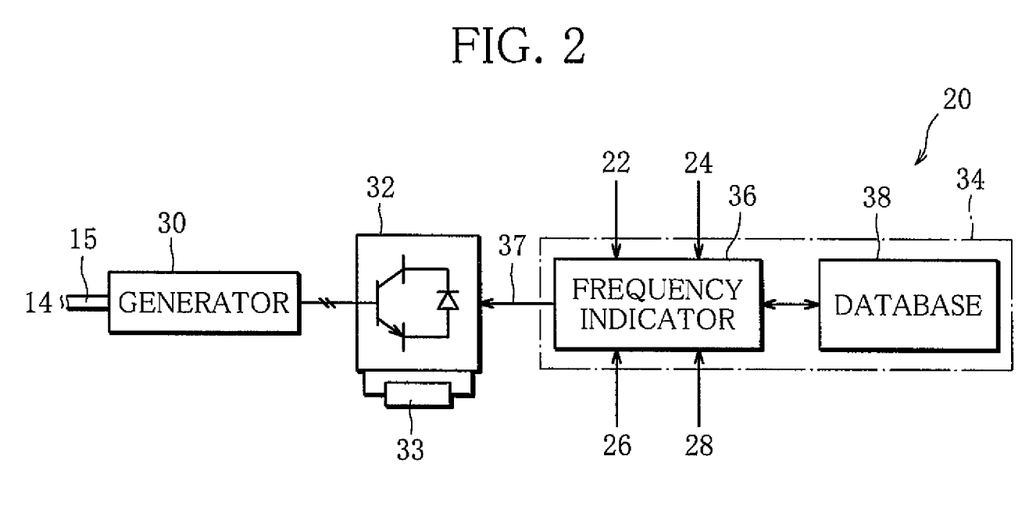
FIG. 2 is a diagram showing a configuration of a controller shown in FIG. 1.

To be specific, referring to a diagram showing a configuration of the power generating system 20 shown in FIG. 2, the power generating system 20 is formed of a generator 30, a PWM converter (converter) 32 and a controller 34.

The controller 34 includes a frequency indicator 36 and a database 38. The sensors 22, 24, 26 and 28 are electrically connected to the frequency indicator 36.

The generator 30 is driven by the expander 14 through a connecting shaft 15, thereby generating AC power. The generator 30 may be formed coaxially and integrally with the expander 14.

The PWM converter 32 is a conversion device that is electrically connected to the generator 30, converts the AC power outputted from the generator 30 into DC power by a pulse-width modulation method, and outputs the DC power to a load device 33. The load device 33 is an electric power system that makes the obtained DC power usable outside the waste heat utilization device 2.

The PWM converter 32 of the present embodiment has the generator 30 and a control circuit, not shown, which controls a rotational frequency of the expander 14 that is rotationally driven integrally with the generator 30. A gate signal 37 functioning as rotational frequency is inputted from the frequency indicator 36 to the control circuit.

The frequency indicator 36 contains memory, not shown. Refrigerant data detected by the sensors 22, 24, 26 and 28 is periodically inputted to the memory. On the basis of the refrigerant data, the frequency indicator 36 carries out various kinds of calculations and a control routine, mentioned below, with reference to the database 38. The frequency indicator 36 then outputs to the PWM converter 32 the gate signal 37 that has been thus determined.

More concretely, the frequency indicator 36 calculates a volume ratio (Ve/Vs) that is a ratio of refrigerant discharge volume Ve to refrigerant suction volume Vs in the expander 14 (hereinafter, referred to as Rv), a pressure ratio (Ps/Pe) that is a ratio of suction pressure Ps to discharge pressure Pe (so-called expansion ratio, and hereinafter, referred to as Rp), and a theoretical preset pressure ratio $(Ve/Vs)^K$ that is a theoretical value of the pressure ratio Rp and is obtained by multiplying the volume ratio Rv by the specific heat ratio of the refrigerant which is referenced in the database 38 (hereinafter, referred to as Rpi). The calculated volume ratio Rv, pressure ratio Rp, and theoretical preset pressure ratio Rpi are periodically stored in the memory of the frequency indicator 36. The volume ratio Rv is a characteristic value of the expander 14. It is known that, when the pressure ratio Rp equals the theoretical preset pressure ratio Rpi, theoretical maximum efficiency of the expander 14 is obtained, and therefore, theoretical maximum power generation efficiency Eim of the generator 30 is also obtained.

The database 38 is a data table capable of exchanging data with the frequency indicator 36. The database 38 is constructed so that a specific heat ratio K1 of the refrigerant sucked into the expander 14 can be referenced on the basis of the suction pressure Ps and the suction temperature Ts detected by the sensors 22 and 24, and that a specific heat ratio K2 of the refrigerant discharged from the expander 14 can be referenced on the basis of the discharge pressure Pe and the discharge temperature Te detected by the sensors 26 and 28.

The frequency indicator 36 calculates a specific heat ratio K $(=(K1+K2)/2)$ of the refrigerant travelling from the inlet 14a of the expander 14 to the outlet 14b by carrying out an average calculation of the specific heat ratios K1 and K2 invoked from the database 38. Preferably, interpolation is carried out at the time of reference of the database 38.

The frequency indicator 36 determines the gate signal 37 according to the preset pressure ratio Rps that is a set value of the pressure ratio Rp, and outputs the gate signal 37 to the PWM converter 32. The PWM converter 32 carries out the rotational speed control of the generator 30 and the expander 14 according to the gate signal 37 determined in the above-mentioned manner.

To be concrete, the PWM converter 32 reduces a rotational speed N of the expander 14 when the pressure ratio Rp is lower than the preset pressure ratio Rps, and increases the rotational speed N of the expander 14 when the pressure ratio Rp is higher than the preset pressure ratio Rps. The PWM converter 32 thus carries out the rotational speed control of the expander 14 to maintain the pressure ratio Rp substantially equal to the preset pressure ratio Rps.

Referring to a process in which the pressure ratio Rp is fluctuated by increase/decrease of the rotational speed N, for example, the decrease of the rotational speed N increases drive torque and also increases a passing resistance of the refrigerant passing through the expander 14. As a result, an evaporated refrigerant that has passed through the evaporator 10 stagnates on the inlet side of the expander 14, and the evaporating pressure of the refrigerant is therefore increased, resulting in an increase in the pressure ratio Rp.

Figure 3:
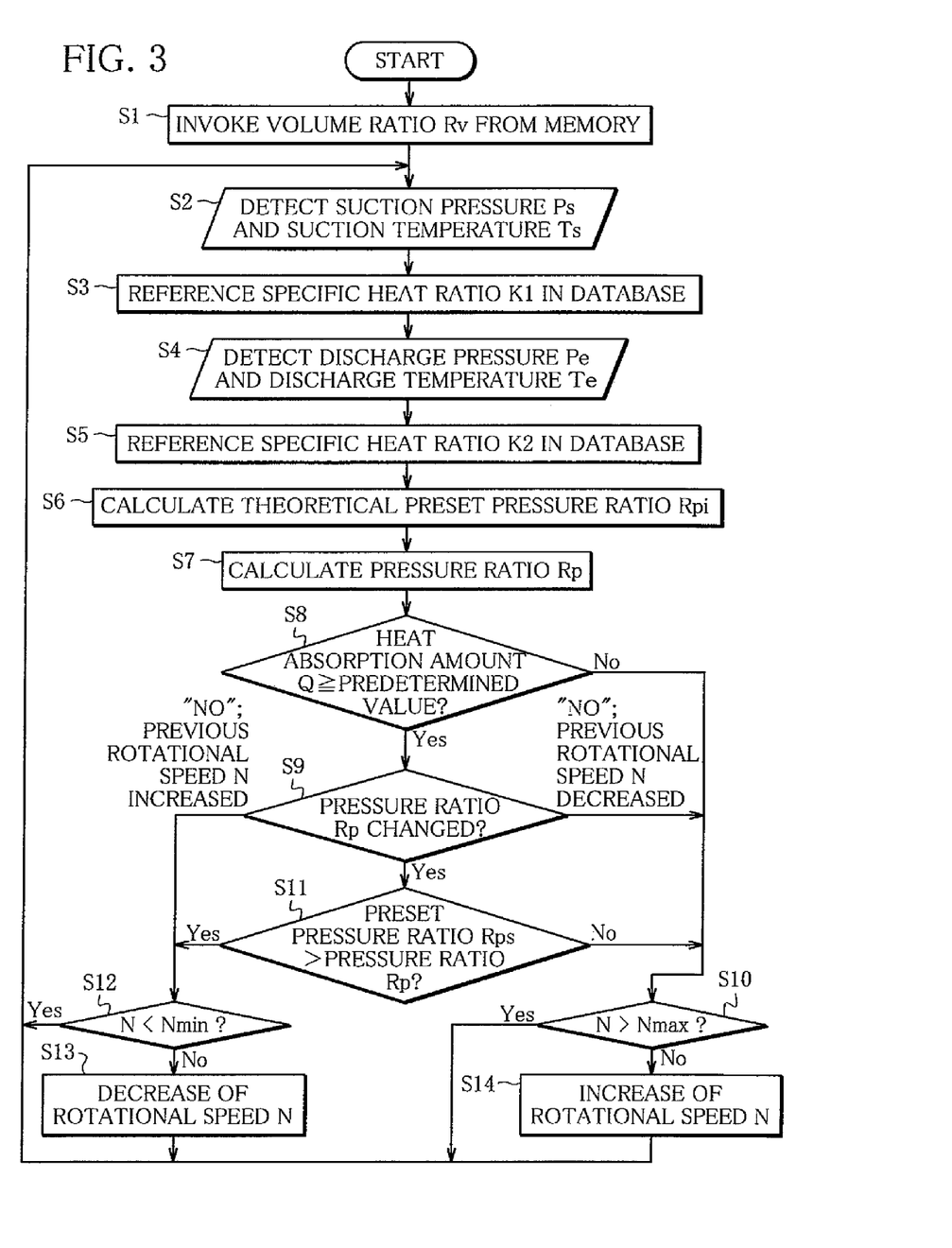
FIG. 3 is a flowchart showing a control routine for controlling the rotational speed of an expander, which is carried out by the controller shown in FIG. 2.

A control routine of the rotational speed control of the expander 14, which is carried out by changing the gate signal 37 in the frequency indicator 36, will be described below with reference to a flowchart shown in FIG. 3.

First, once the rotational speed control is started, the process proceeds to S1 ("S" represents a step).

S1 invokes the volume ratio Rv from the memory of the frequency indicator 36. The process then advances to S2.

S2 detects the suction pressure Ps and the suction temperature Ts by using the sensors 22 and 24. The process then advances to S3.

S3 refers to the database 38 for the specific heat ratio K1 corresponding to the suction pressure Ps and the suction temperature Ts detected in S2. The process then advances to S4.

S4 detects the discharge pressure Pe and the discharge temperature Te by using the sensors 26 and 28. The process then advances to S5.

S5 refers to the database 38 for the specific heat ratio K2 corresponding to the discharge pressure Pe and the discharge temperature Te detected in S4. The process then advances to S6.

S6 averages the specific heat ratios K1 and K2 to obtain the specific heat ratio K, and calculates the theoretical preset pressure ratio Rpi by using the specific heat ratio K. The process then advances to S7.

S7 calculates the pressure ratio Rp, and the process then advances to S8.

S8 makes a determination as to whether a heat absorption amount Q that is the amount of heat absorption from the coolant circuit 6 in the evaporator 10 is equal to or larger than a predetermined value. If the result is YES, and it is determined that the heat absorption amount Q is equal to or larger than the predetermined value, the process moves to S9. If the result is NO, and it is determined that the heat absorption amount Q is smaller than the predetermined value, the process moves to S10. Where the evaporation temperature of the refrigerant and the inlet temperature of the coolant in the evaporator 10 are Ti and Th, respectively, and a heat transfer coefficient and heat transfer area, which are characteristic values of the evaporator 10, are a and A, respectively, the heat absorption amount Q is generally calculated by equation, $Q = a \times A \times (Th - Ti)$.

If the process proceeds to S9, a determination is made as to whether the pressure ratio Rp is changed. If the result is YES, and it is determined that the pressure ratio Rp is changed, the process advances to S11. If the result is NO, and it is determined that the pressure ratio Rp is not changed, the process moves to S12 when the rotational speed N of the expander 14 is increased in the previous cycle of the present control routine, whereas the process moves to S10 when the rotational speed N of the expander 14 is decreased in the previous cycle of the present control routine. When S9 is carried out in the first cycle of the present control routine, the process proceeds to S11 without condition.

If the process moves to S11, a determination is made as to whether an inequality, the preset pressure ratio Rps>the pressure ratio Rp, is true. If the result is YES, and it is determined that the inequality, the preset pressure ratio Rpi>the pressure ratio Rp, is true, the process moves to S12. If the result is NO, and it is determined that the inequality, the preset pressure ratio Rpi>the pressure ratio Rp, is not true, the process moves to S10.

If the process moves from S9 or S11 to S12, a determination is made as to whether the rotational speed N of the expander 14 is lower than minimum rotational speed Nmin. If the result is YES, and it is determined that the inequality, N<Nmin, is true, the process moves to S2 and starts the subsequent cycle of the present control routine. If the result is NO, and it is determined that the inequality, N<Nmin, is not true, or that the inequality, N≥Nmin, is true, the process moves to S13. The minimum rotational speed Nmin is previously set equal to or higher than such a predetermined value that the efficiency of the expander 14 is not extremely degraded in response to the decrease of the rotational speed N, or more specifically, is set as a rotational speed value (for example, approximately 1000 rpm) that is 75 percent or more of the maximum efficiency according to a result of an experiment conducted by the inventors.

If the process moves from S8, S9 or S11 to S10, a determination is made as to whether the rotational speed N of the expander 14 is higher than maximum rotational speed Nmax. If the result is YES, and it is determined that the inequality, N>Nmax, is true, the process moves to S2 and starts the subsequent cycle of the present control routine. If the result is NO, and it is determined that the inequality, N>Nmax, is not true, or that the inequality, N≤Nmax, is true, the process moves to S14. The maximum rotational speed Nmax is previously set as a rotational speed value based upon a predetermined safety coefficient relative to the drive of the expander 14.

If the process advances to S13, the rotational speed N of the expander 14 is reduced by predetermined degree. Thereafter, the process moves to S2 and starts the subsequent cycle of the present control routine.

If the process advances to S14, the rotational speed N of the expander 14 is increased by predetermined degree. Thereafter, the process moves to S2 and starts the subsequent cycle of the present control routine.

As described above, the rotational speed control properly changes the rotational speed N of the expander 14 to maintain the pressure ratio Rp substantially equal to the preset pressure ratio Rps.

When the rotational speed control is carried out, in order to approximate the power generation efficiency E of the generator 30 to the theoretical maximum power generation efficiency Eim, as stated above, it is theoretically required that the rotational speed N of the expander 14 should be changed so that the pressure ratio Rp is equal to the theoretical preset pressure ratio Rpi. More specifically, the preset pressure ratio Rps is previously set at the theoretical preset pressure ratio Rpi, and the rotational speed N of the expander 14 is changed so that the ratio R of the pressure ratio Rp to the preset pressure ratio Rps is 1.0.

However, the expansion of the refrigerant in the expander 14 is actually a polytropic expansion because of heat entry and exit resulted from a slight leakage of the refrigerant or the like. Without a consideration of this matter, it is impossible to achieve the maximum power generation efficiency Em that is an actual maximum value of the power generation efficiency E of the generator 30.

Figure 4:
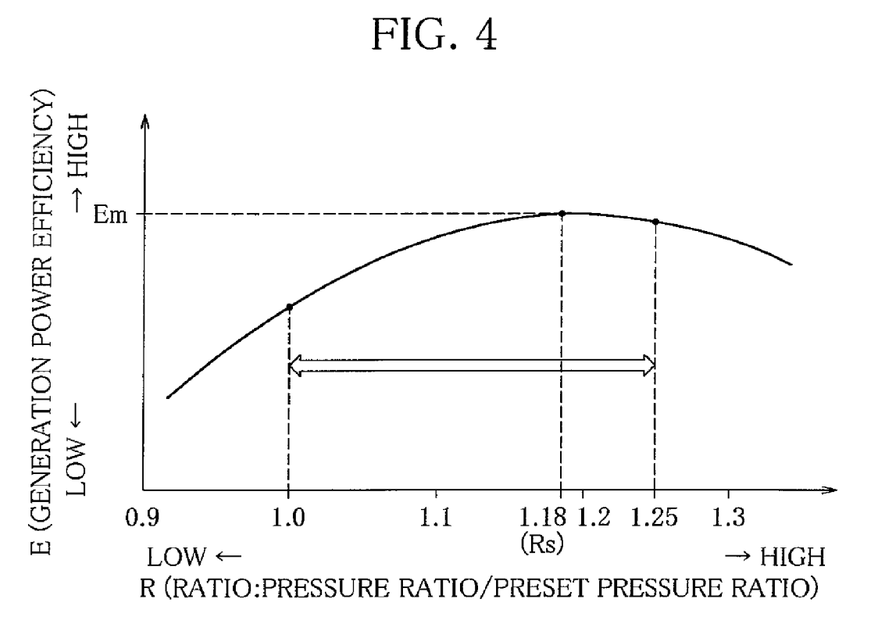
FIG. 4 is a curvilinear graph showing relationship between ratio R of pressure ratio Rp to preset pressure ratio Rps and power generation efficiency E of a generator.

To be more concrete, referring to a curvilinear graph of FIG. 4, showing relationship between the ratio R and the power generation efficiency E, the result of an experiment in the RC circuit 8 of the present embodiment shows that the power generation efficiency E can be approximated to the maximum power generation efficiency Em by previously setting the preset pressure ratio Rps to fall in such a range that a set value of the ratio R can be about 1.18 (hereinafter, referred to as preset ratio Rs) as shown by a solid line, and by carrying out the rotational speed control of the expander 14 so that the pressure ratio Rp is maintained virtually constant in the vicinity of the preset pressure ratio Rps.

In general, a direction in which the ratio R is increased with the preset ratio Rs used as a boundary is called under-expansion, whereas a direction in which the ratio R is decreased is called overexpansion. It is known that an inclination of the curve of FIG. 4 is smaller during under-expansion than during overexpansion, and then that the power generation efficiency E is further approximated to the maximum power generation efficiency Em.

According to the invention, taking into account the fact that the preset ratio Rs at which the maximum power generation efficiency Em can be achieved is not actually 1.0, and that the ratio R that is located on the under-expansion side is advantageous for achieving the maximum power generation efficiency Em, and based upon the fact that the relation, the ratio $R \geq 1.0$, is always true when the RC circuit 8 normally operates, the preset pressure ratio Rps is previously set to achieve the relation, $1.0 \leq R \leq 1.25$ (a range shown by solid arrows in FIG. 4).

S8 of the rotational speed control makes a determination as to whether the heat absorption amount Q is equal to or higher than the predetermined value. When the heat absorption amount Q cannot be secured, it is attributable to the fact that, since the condenser 16 is an air-cooled type, refrigerant condensation temperature in the condenser 16 becomes high if outside air temperature is high, so that the refrigerant evaporation temperature Ti is increased by carrying out the rotational speed control of the expander 14, which inevitably reduces temperature difference $\Delta T$ between the refrigerant evaporation temperature Ti and the inlet temperature Th of the coolant in the evaporator 10.

The heat balance of the RC circuit 8 will be described below with reference to a Mollier graph shown in FIG. 5.

Before the rotational speed control of the expander 14 of the present embodiment is carried out, a refrigerant (A) flows into the evaporator 10 and is heated with the hot water flowing through the coolant circuit 6, which has been heated in the engine 4. The refrigerant (A) is thus turned into a gaseous refrigerant (B) whose enthalpy i is increased. The refrigerant (B) is expanded by the expander 14 into a depressurized refrigerant (C). The refrigerant (C) is condensed by the condenser 16 into a refrigerant (D) whose enthalpy i is decreased. The refrigerant (D) is turned into the refrigerant (A) by being pressurized with the refrigerant pump 18, and then flows into the evaporator 10 again.

The evaporation temperature Ti of the refrigerant (A) is about 80 degrees centigrade. The inlet temperature Th of a coolant a is about 90 degrees centigrade. It is therefore possible to achieve a temperature difference $\Delta T$ of about 10 degrees centigrade and thus obtain the predetermined heat absorption amount Q.

Figure 5:
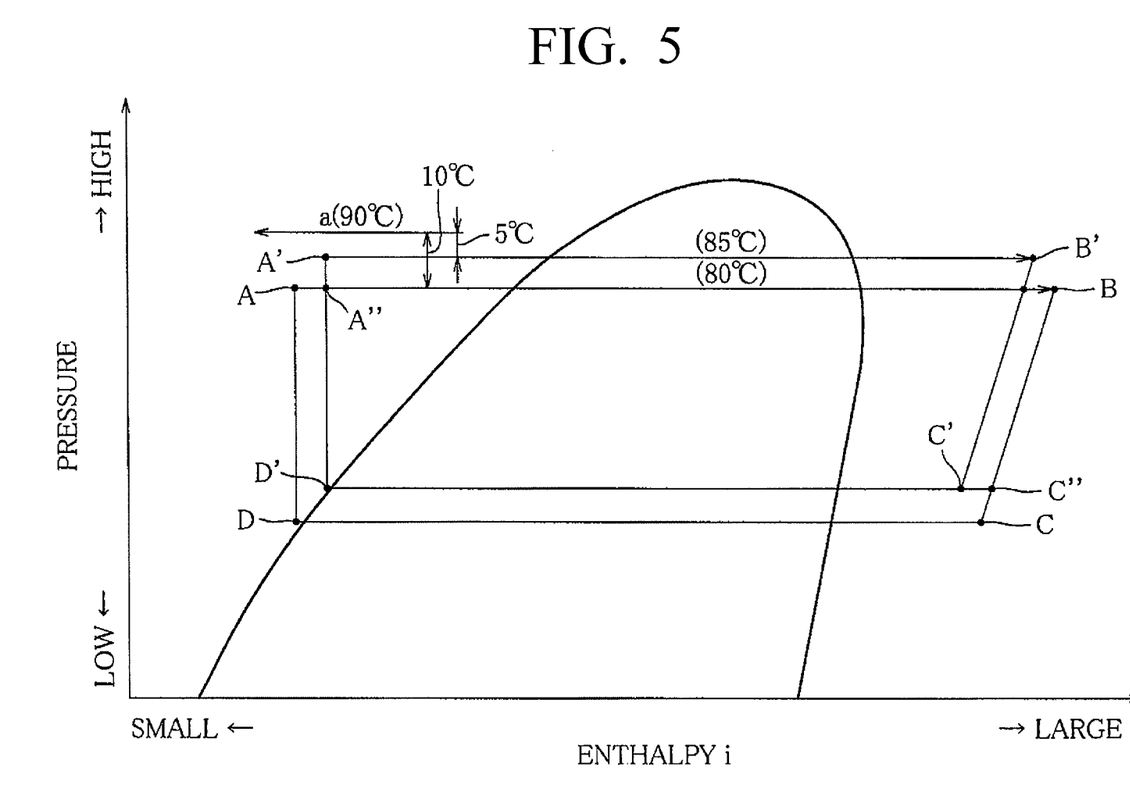
FIG. 5 is a Mollier graph showing the heat balance of a Rankine cycle circuit shown in FIG. 1.

When the rotational speed control of the expander 14 of the present embodiment is carried out, the evaporation temperature Ti is increased, for example, by about 85 degrees centigrade as mentioned above, and the cycle is repeated in the order of A', B', C' and D' as shown in FIG. 5. In this case, the temperature difference $\Delta T$ is reduced by half to about 5 degrees centigrade, so that the predetermined heat absorption amount Q cannot be obtained.

It is then necessary to prevent the evaporation temperature Ti from being increased too much at the time of the rotational speed control, and obtain the heat absorption amount Q required in the RC circuit 8, that is, heat discharge Q' required for the refrigeration of the engine 4 by using coolant.

To be specific, the rotational speed N is increased in a case where the temperature difference $\Delta T$ is equal to or lower than predetermined temperature, where the inlet/outlet temperature of the coolant in the engine 4 is equal to or higher than predetermined temperature, where the inlet/outlet temperature of the coolant in the evaporator 10 is equal to or higher than predetermined temperature or where a value obtained by multiplying an inlet/outlet temperature difference of the coolant in the evaporator 10 by the amount of the coolant passing through the evaporator 10 is equal to or lower than a predetermined value, or the like. As a result, the cycle is repeated in the order of A", B, C" and D' as shown in FIG. 5. It is possible to achieve a temperature difference $\Delta T$ of about 10 degrees centigrade while carrying out the rotational speed control, so that the predetermined heat absorption amount Q can be secured. Consequently, even if the RC circuit 8 is actuated depending on seasons, and the rotational speed N of the expander 14 is changed in a wide rotational speed range, it is possible to further reliably enhance the efficiency in the waste heat recovery of the waste heat utilization device 2 and thus the power generation efficiency E, and approximate the power generation efficiency E to the maximum power generation efficiency Em.

As described above, the present embodiment carries out the control routine relative to the rotational speed control by using the frequency indicator 36, and controls the rotational speed of the expander 14 while properly changing the gate signal 37. As a result, even if the RC circuit 8 is actuated depending on seasons, and the rotational speed N of the expander 14 is changed in the wide rotational speed range, the pressure ratio Rp that is the expansion ratio of the expander 14 can be maintained virtually constant at the position where the maximum power generation efficiency Em is achieved. It is therefore possible to reliably enhance the efficiency in the waste heat recovery of the waste heat utilization device 2 and thus the power generation efficiency E, and approximate the power generation efficiency E to the maximum power generation efficiency Em.

Since the controller 34 has the database 38 in which the specific heat ratios K1 and K2 can be referenced, the specific heat ratio K of the refrigerant passing through the expander 14 can be easily calculated, and the efficiency in the waste heat recovery and thus the power generation efficiency E can be easily and reliably enhanced.

In the steps S9, S12 and S13 or the steps S9, S10 and S14 of the control routine of the rotational speed control, in case that the pressure ratio Rp is not changed by increasing or decreasing the rotational speed N of the expander 14, if the rotational speed N of the expander 14 is set back to the rotational speed N of the previous cycle, it is possible to eliminate a needless process of changing the rotational speed N of the expander 14 when there is no change in the pressure ratio Rp. It is then possible to promote the stability of actuation of the RC circuit 8 and the waste heat utilization device 2 and thus the efficiency in the rotational speed control of the expander 14, and to further enhance the efficiency in the waste heat recovery of the waste heat utilization device 2 and thus the power generation efficiency E.

Especially, according to the invention, the ratio R of the pressure ratio Rp to the preset pressure ratio Rps is calculated by the frequency indicator 36, and the preset pressure ratio Rps is previously determined to achieve the relation, $1.0 \leq R \leq 1.25$. For that reason, it is possible to further reliably achieve the maximum efficiency in the waste heat recovery of the waste heat utilization device 2 and thus the maximum power generation efficiency Em.

The one embodiment of the invention has been described, but the invention is not limited to the above-mentioned embodiment. The invention may be modified in various ways without deviating from the gist thereof.

For example, the embodiment previously sets the preset pressure ratio Rps to achieve the relation, $1.0 \leq R \leq 1.25$. However, the range is not limited to this. It is possible to estimate the preset ratio Rs on the assumption that the refrigerant leakage performance is upgraded by performance improvement of the expander 14, and previously set the preset pressure ratio Rps on the basis of the preset ratio Rs, for example, so that the ratio R falls in a range of Rs−0.05≤R≤Rs+0.05. In this case, even if the refrigerant leakage performance is improved as a result of the performance improvement of the expander 14, it is possible to carry out the rotational speed control of the expander 14 with accuracy at any time. Consequently, the maximum efficiency in the waste heat recovery of the waste heat utilization device 2 and thus the maximum power generation efficiency Em can be further reliably achieved.

In the embodiment, the specific heat ratios K1 and K2 are referenced by the database 38 and the sensors 22, 24, 26 and 28, and thus the specific heat ratio K is calculated. Alternatively, only the specific heat ratio K1 may be used simply as specific heat ratio. This eliminates the need for the sensors 26 and 28, reducing the cost of the RC circuit 8.

Furthermore, in the embodiment, the PWM converter 32 increases/decreases the rotational speed N of the expander 14, but the rotational speed N may be increased and decreased by changing the load of the load device 33.

The invention claimed is:

1. A waste heat utilization device for an internal combustion engine, comprising:
   a Rankine cycle provided in a refrigerant channel with an evaporator that heats a refrigerant by using waste heat recovered from an internal combustion engine and thus secures predetermined heat absorption amount from the internal combustion engine, an expander that expands the refrigerant that has passed through the evaporator at a predetermined volume ratio and thus produces a rotational drive force, a condenser that condenses the refrigerant that has passed through the expander, and a pump that pumps the refrigerant that has passed through the condenser into the evaporator, in the order named;
   a generator that is rotationally driven by the expander and converts the rotational drive force into electric power;
   a converter that controls the rotational speed of the expander through the generator;
   refrigerant-condition detecting means that detects pressure and temperature of the refrigerant passing through the expander; and
   a controller programmed to calculate a ratio between refrigerant pressures in the immediate upstream and downstream of the expander, and a specific heat ratio of the refrigerant passing through the expander on the basis of the pressure and temperature of the refrigerant, which have been detected by the refrigerant-condition detecting means, calculates a preset pressure ratio of the pressure ratio by multiplying the predetermined volume ratio by the specific heat ratio, and specifies the rotational speed of the expander to the converter on the basis of the pressure ratio and the preset pressure ratio,
   wherein the controller calculates a ratio of the pressure ratio to the preset pressure ratio, and previously sets the preset pressure ratio so that the calculated ratio falls in a predetermined range in consideration of heat entry into and heat exit from the expander.

2. The waste heat utilization device for an internal combustion engine according to claim 1, wherein the controller decreases the rotational speed of the expander when the pressure ratio is lower than the preset pressure ratio, and increases the rotational speed of the expander when the pressure ratio is higher than the preset pressure ratio.

3. The waste heat utilization device for an internal combustion engine according to claim 1, wherein the controller has a database in which the specific heat ratio is referenced on the basis of the pressure and temperature of the refrigerant, which have been detected by the refrigerant-condition detecting means.

4. The waste heat utilization device for an internal combustion engine according to claim 1, wherein the controller sets the rotational speed of the expander back to the rotational speed before being changed when the pressure ratio is not changed by variation of the rotational speed of the expander.

5. The waste heat utilization device for an internal combustion engine according to claim 1, wherein the controller varies the rotational speed of the expander within a range from minimum rotational speed that makes the efficiency of the expander equal to or higher than a predetermined value to maximum rotational speed based upon a safety coefficient relative to the rotation of the expander.

6. The waste heat utilization device for an internal combustion engine according to claim 5, wherein the controller sets the rotational speed of the expander to secure the predetermined heat absorption amount.

7. The waste heat utilization device for an internal combustion engine according to claim 1, wherein the controller previously sets the preset pressure ratio so that the ratio falls in a range from 1.0 to 1.25.

8. The waste heat utilization device for an internal combustion engine according to claim 1, wherein the controller previously estimates a preset ratio of the ratio at which the power generation efficiency of the generator becomes the highest, and previously sets the preset pressure ratio so that the ratio falls in a range of 0.05 either side of the preset ratio.

* * * * *